March 21, 1961   R. CUNNINGHAM, JR   2,975,771
FIRE EXTINGUISHING SYSTEM
Filed Feb. 11, 1957   2 Sheets-Sheet 1
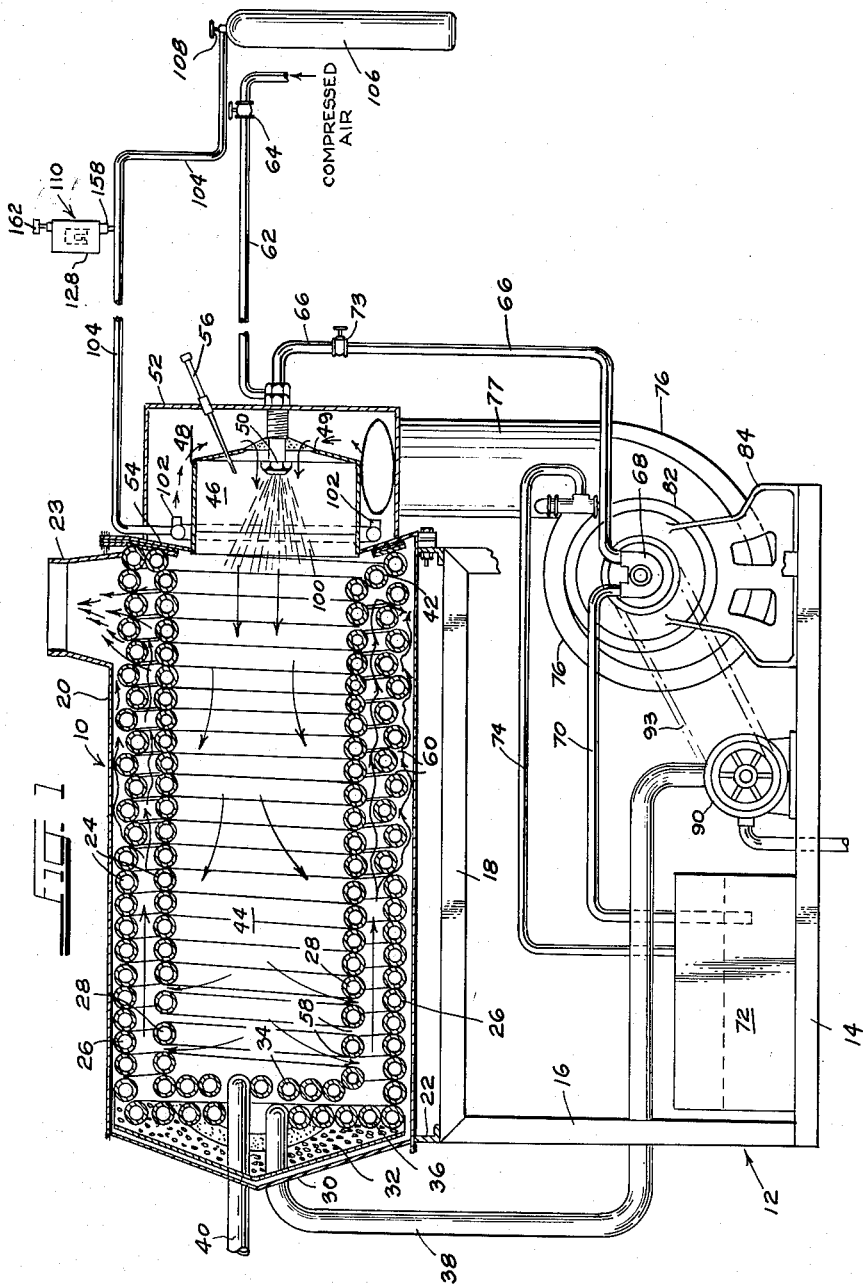
INVENTOR.
RICHARD CUNNINGHAM JR.
BY

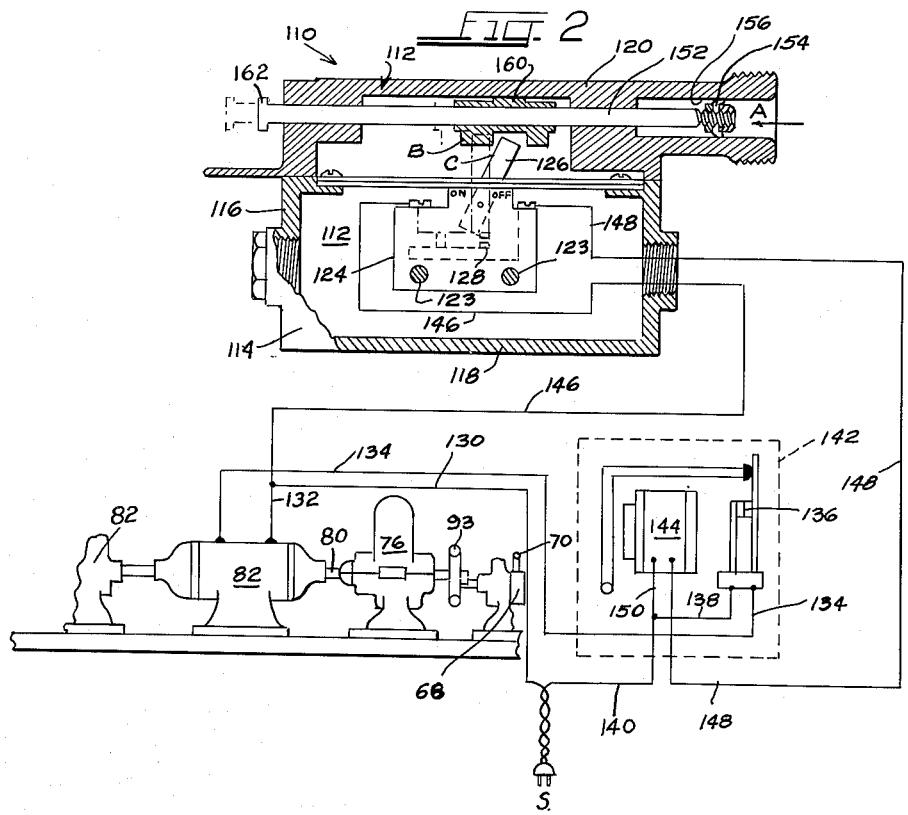

United States Patent Office 2,975,771
Patented Mar. 21, 1961

2,975,771

FIRE EXTINGUISHING SYSTEM

Richard Cunningham, Jr., Houston, Tex., assignor to Vapor Heating Corporation, Chicago, Ill., a corporation of Delaware Filed Feb. 11, 1957, Ser. No. 639,273

2 Claims. (Cl. 122—504)

The present invention relates to fire extinguishing systems and has particular reference to a semi-automatic system whereby an operator in attendance at a hot oil heater or similar apparatus having a fire chamber may, upon discovering the presence of a leak in the hot oil system within the fire chamber, quickly flood the said chamber with a combustion inhibiting gas such as carbon dioxide and, at the same time, terminate the operation of the heater.

Hot oil heaters of the type referred to above are similar in their construction to oil or gas fired hot water heaters or boilers of the coiled water tube type, the principal difference being that oil instead of water is circulated through the coiled tubing of the heater for assimilation of heat by conduction through the walls of the tubing from the hot gases which flow around the outside of the tubing. Such heaters are essentially high temperature, low pressure devices and they find numerous applications in industry as for example in molding rubber and other plastic materials, in melting or maintaining a low viscosity in materials such as asphalt, wax or the like, in evaporating high boiling liquids, in fractionating hydrocarbon oils, and in many other processes too numerous to mention. The heated fluid, i.e. the oil heated in heaters of this character is invariably in the form of a highly refined petroleum oil having a high flash point and capable of being heated to relatively high temperatures, for example, 600° F., without danger of breakdown. It is obvious that oil of this character is highly inflammable at elevated temperatures and that precautions must be taken to prevent leakage of the oil from the tubing in which it is confined, particularly in the vicinity of the fire chamber of the heater where any such leakage will, if not promptly remedied, cause either an explosion or a widespread conflagration. Despite these precautions, and due to the existence of localized stresses under the influence of thermal expansion and contraction in the coiled tubing, cracks are occasionally created in the tubing with the resultant leakage of the oil into the fire chamber. Such leakage is readily apparent to the operator in attendance at the heater inasmuch as it is invariably accompanied by a "flash" or sudden large increase in flame volume within the fire chamber. It is obvious that in such instances immediate shutting down of the system is in order but, due to the fact that although the system is a low pressure one, some pressure at least is maintained within the coiled tubing and, after the heater is de-activated and the circulation of oil through the heating coils is discontinued, oil under low pressure will continue to be fed to the residual conflagration through the crack in the tubing.

The present invention is designed to overcome the above-noted limitation that is attendant upon the use and maintenance of hot oil heaters utilizing inflammable oil as the heated medium and, toward this end, it contemplates the provision of a fire extinguishing system including a source of a fire inhibiting gas such as carbon dioxide which will "smother" the conflagration, so to speak, by displacing the source of combustible oxygen within the fire chamber, such gas being immediately available for application directly to the fire chamber by the mere manipulation of a single valve. The invention further contemplates the provision of a novel means for immediately and automatically shutting down of the system at the time the valve is opened, such means being partially pneumatic and partially electrical in its functioning and involving the use of a pressure actuated switch by means of which certain relay mechanism is set into operation to effect ultimate disabling of the heater simultaneously with the application of the fire quenching gas to the fire chamber.

The provision of a fire extinguishing system of the character briefly outlined above being among the principal objects of the invention, numerous other objects and advantages thereof will become readily apparent as the following description ensues.

In the accompanying two sheets of drawings forming a part of this specification, a preferred embodiment of the invention has been shown.

In these drawings:

Fig. 1 is a schematic representation of the improved fire extinguishing system comprising the present invention and showing the same operatively applied to a hot oil heater with the latter being shown in longitudinal section.

Fig. 2 is a longitudinal sectional view taken substantially centrally through a pressure switch employed in connection with the invention, together with a circuit diagram of the system with which the switch is associated.

Referring now to the drawing in detail, and in particular to Fig. 1, the hot oil heater to which the present system is applied is designated in its entirety at 10. This heater 10 is of more or less conventional construction and is shown as being mounted on an open frame like base structure 12 including a base plate 14, upstanding side members 16 and upper horizontal members 18. The heater 10 is provided with an outer cylindrical shell 20, the axis of which extends horizontally, with the shell being mounted on the base structure 12 by means of angle members 22. An exhaust stack 23 is provided adjacent the right hand end of the shell 20 at the top thereof.

The heater illustrated herein is of the coiled-tube type, which is to say that the coiled tubing associated therewith is adapted to contain the oil to be heated with the coils thereof being positioned directly in the path of hot gases generated in the fire chamber of the heater. Accordingly, the heater tubing 24 is wound in the form of two concentric helices including a series of outer coils 26 and a series of inner coils 28, the latter being spaced inwardly a slight distance from the outer coils and both series of coils extending around the heater shell 20 in the peripheral regions thereof. The left hand end of the shell as seen in Fig. 1 is closed by an end wall 30 and a generally circular refractory fire wall 32 is positioned within the shell adjacent the end wall 30. The helically wound inner and outer series of coils are spirally wound at the left hand end of the series as shown at 34 and 36 respectively so as to extend radially inwardly of the helices. The innermost coil winding of the spirally wound coils 36 communicates with an oil inlet pipe 38 while the innermost coil winding of the spirally wound coils 34 similarly communicates with a hot oil outlet pipe 40. At the right hand end of the coil structure 24, the inner and outer coil windings 26 and 28 respectively merge and communicate with each other by means of an intermediate coil winding 42 with the entire set of coil windings being formed by the continuous winding of a single elongated length of the tubing 24.

The coil structure just described defines a central fire chamber 44, the left hand end of which is closed by the fire wall structure 32 and the right hand end of which is open and in register with a burner assembly 46 including the usual burner hood assembly 48, including a perforated stabilizing cone 49 and a burner proper or nozzle 50. The burner assembly 46 is supported in its operative position on the shell 20 by a hood element 52, the open rim of which is supported on an end closure for the shell 20 in the form of a ring 54 and cooperates with the burner hood assembly 49 to define a burner plenum chamber. The burner assembly 46 includes the usual spark plug 56 for initiating combustion of fuel oil or other fuel at the burner nozzle 50.

It is to be noted that the coils of the inner series of windings 28 are arranged in substantial contiguity throughout a major longitudinal extent of the series and, at the left hand end of the series, the adjacent coils are spaced apart a slight distance to allow passage of the hot gases of combustion radially outwardly through the various interstices 58 created by such spacing of the coils. The coils of the outer series of windings 26 are arranged in substantial contiguity at the left hand end of the series where they surround the spaced coils of the inner series and the remaining coils of the outer series are staggered so that adjacent coils are slightly separated from each other by interstices 60. The adjacent coils of the two spirally wound series 34 and 36 at the end of the heater shell remote from the burner assembly 46 are contiguous. The fire chamber 44 which exists by virtue of the coil arrangement just described, provides a relatively long combustion path to accommodate the use of heavy oils as fuel. The combustion, initially created by the presence of a relatively long flame at the burner 50, strikes the fire wall 32, and thereby creates a high degree of turbulence in the chamber which is conducive toward maximum heat transfer through the wall of the hot tubing 24 as well as complete combustion of the fuel. Insofar as the direct path of the products of combustion through the fire chamber from the burner 50 to the exhaust stack 23 is concerned, the gases pass radially outwardly through the interstices 58 and impinge against the solid wall of coils in the series 26 at the left hand end of the shell, from whence they travel rearwardly and flow in and through the interstices 60 and thus pass around both sides of the various spaced coils in the series 26 and leave the shell 20 through the stack 23 at the top of the shell.

Compressed air for atomizing the oil at the burner 50 may be supplied to the latter through a line 62 having a manually operable shut-off valve 64 interposed therein and leading from a suitable source of air under pressure (not shown) as for example a compressor or compressed air tank. Fuel oil is supplied to the burner 50 through a line 66 leading from the discharge side of a fuel oil pump 68, the intake side thereof communicating through a line 70 with a fuel tank 72 which may be mounted on the base plate 14. A manual shut-off valve 73 is provided in the line 66 and a by-pass or return line 74 extending between the line 66 and tank 62 is effective to return fuel oil to the latter when the valve 73 is closed, all in the usual manner of operation of such fuel oil systems. A blower 76 supplies air to the combustion chamber 44 through a conduit 77 communicating with the interior of the plenum chamber defined by the hood 52 and the burner hood assembly 48.

The fuel oil pump 68 and blower 76 utilize a common drive shaft or drive shaft assembly 80 which, in the schematic representation of Fig. 1, is shown as being operatively driven by means of a motor 82. The pump 68, blower 76 and motor 82 are all operatively mounted on a standard 84 supported on the base plate 14.

The oil undergoing heating is forced through the various heater coils associated with the tubing 24 by means of a circulating oil pump 90, the inlet side of which communicates through a line 92 with a suitable source (not shown) of such oil. The outlet side of the pump 90 is connected to the oil inlet pipe 38. The pump 90 may be mounted on the base plate 14 at a convenient location thereon and may be driven from the motor 82 by means of a belt and pulley arrangement 93.

The arrangement of parts thus far described, as well as the construction of the heater assembly 10, is conventional and no claim is made herein to any novelty associated with the same, the novelty of the present invention residing rather in the fire extinguishing system associated with the heater 10 and which will be more fully described and subsequently claimed.

As previously described, the fire extinguishing system of the present invention is semi-automatic in its operation and comprises a manually operable means for "flooding" the fire chamber with a comparatively large stream of carbon dioxide gas and an automatic means for shutting down the heater immediately upon admission of such carbon dioxide to the fire chamber. Accordingly, a carbon dioxide supply manifold 100 is positioned at the burner end of the shell 10 and is in the form of a circular ring of hollow construction which surrounds the burner hood assembly 48 immediately behind the end closure 54 and within the plenum chamber. The manifold 100 is provided with a series of spaced rearwardly directed jet-forming nozzles 102 the jets from which are adapted to impinge upon the vertical wall of the hood 52 and thus be directed through the hood 48 and into the interior of the fire chamber 44. The manifold 100 is operatively connected by a supply line 104 with a suitable source of carbon dioxide, as for example a conventional commercially available carbon dioxide cylinder 106 adapted to contain a supply of the gas under pressure. The cylinder is provided with the usual valved fitting 108 by means of which the cylinder is connected to the line 104.

Interposed in the line 104 extending between the cylinder 106 and manifold 100 is a pressure actuated switch 110, the details of which are illustrated in Fig. 2 and the function of which is to energize a relay circuit which, when so energized, serves to open the electric circuit for the motor 82 and thus terminate the operation of the instrumentalities powered thereby including the fuel oil pump 68, the blower 76 and the circulating oil pump 90. The pressure actuated switch 110 is of the plunger-operated type, as will be described presently, and is responsive to superatmospheric pressure in the line 104 to close its contacts and thus energize the circuit-opening relay mechanism as stated above. Accordingly, as shown in Fig. 2, the switch assembly 110 is in the form of a generally rectangular casing 112 which may be formed of Bakelite or other suitable plastic material having side and end walls 114 and 116 respectively, a bottom wall 118 and a top wall 120. The various walls of the casing 112 define therebetween a chamber 122 within which there is mounted on rods 123 a switch assembly 124 having an operating finger 126 which is movable between the full line "off" position thereof illustrated in Fig. 2 wherein the contacts 128 associated with the assembly are open, and the dotted line "on" position wherein such contacts are closed.

Referring now to the circuit diagram portion of Fig. 2, the electric motor 82 which drives the blower 76, fuel oil pump 68 and circulating oil pump 90 is disposed in a normally closed circuit which extends from a suitable source, as for example a commercially available source S of 110 volt alternating current, through leads 130, 132, motor 82, lead 134, a pair of normally closed relay contacts 136, and leads 138 and 140, back to the source S. The normally closed contacts 136 are associated with a relay mechanism designated in its entirety at 142 and are adapted to become open upon energization of an electromagnet 144. The circuit for the electromagnet 144 is a normally open circuit and extends from the source S, through leads 130, 146, contacts 128 of the switch assembly 124, lead 148, magnet 144, and leads 150 and 140 to the source.

The operating finger 126 of the switch assembly 124 is operable under the control of a plunger rod 152 which is slidable in the upper regions of the casing 112 and one end of which carries a piston 154 of the leather cup washer variety operable in a cylinder or bore 156 formed in the casing 112. The bore 156 communicates through a short pipe section 158 (Fig. 1) with the line 104. The medial regions of the plunger rod 152 carries a fork member 160 which straddles the end of the operating finger 126 for the switch 124. The piston 154, and consequently the plunger rod 152 on which it is mounted, is movable, under the influence of gas pressure developed in the line 104, from the retracted full line position wherein it is shown in Fig. 2 and wherein the switch 124 is in its "off" position with the contacts 128 open, to the dotted line position wherein the switch 124 is in its "on" position with the contacts 128 closed. The end of the plunger rod 152 remote from the piston 154 projects outwardly of the casing 112 and carries thereon a reset knob 162 by means of which the plunger rod may be restored to its normal retracted position.

From the above description it will be seen that in the operation of the system, the operator, upon detecting the presence of an oil leak in the heater coil tubing 24, will immediately open the valve fitting 108, whereupon carbon dioxide will be released from the cylinder 106 and flow through the line 104 to the manifold ring 100 from whence it will issue in considerable volume from the various jet forming nozzles 102 and be deflected by the vertical wall of the hood 52 through the burner assembly hood 48 and into the fire chamber 44, thus drenching the chamber with the extinguishing gas and obviating the danger of an unduly large conflagration or of an explosion. Immediately upon opening of the valve fitting 108, considerable pressure will be built up in the line 104 and in the short pipe section 158 leading to the pressure actuated switch 110, thus forcing the plunger rod 152 to the left as viewed in Fig. 2 and closing the switch contacts 128. Closure of the contacts 128 establishes the previously described circuit through the electromagnet 144 and energization of the magnet causes opening of the motor circuit contacts 136 as set forth above, thus stopping the motor 82 and terminating the operation of the various instrumentalities which it drives including the blower 76, fuel oil pump 68 and circulating oil pump 90. The rendering of these devices inoperative will, of course, extinguish the flame at the burner nozzle 50 and terminate further circulation of the oil or other fluid undergoing heating through the coil tubing 24.

In compliance with Title 35, U.S. Code, Section 22, a preferred form of the invention has been shown in the drawings and described herein, but it should be understood that the invention is not limited to the specific disclosure made, and that the appended claims should be construed as broadly as the prior art will permit.

I claim:

1. In combination with an oil heater including a fire chamber, means for containing oil to be heated arranged in direct heat exchange relation with the products of combustion within the fire chamber; a burner assembly including a fuel nozzle and a burner assembly hood for directing hot combustion gases into the fire chamber, a plenum chamber enclosing said burner assembly hood and communicating through the interior thereof with the fire chamber, a pump for circulating oil under pressure through said oil containing means, a pump for delivering fuel to said fuel nozzle, a blower for delivering combustion air through said plenum chamber and burner assembly hood into the fire chamber, an electrical motor for operating said pumps and said blower, and a normally closed electrical circuit for energizing said motor, of means for extinguishing the fire within said oil heater including any extraneous flames therein occasioned by oil leaking into the fire chamber comprising a fluid discharge means located in said plenum chamber for flooding the plenum chamber, burner assembly hood and the fire chamber with a flame-inhibiting fluid, a source of such fluid under pressure, a conduit connecting said source with the said fluid discharge means, a shut-off valve disposed in said conduit, and means including a pressure-actuated element responsive to fluid pressure developed in said conduit upon opening of said shut-off valve for opening said normally closed motor circuit.

2. The combination set forth in claim 1 wherein said fluid discharge means located in the plenum chamber is in the form of a hollow circular manifold ring surrounding said burner assembly hood and having jet producing openings formed therein for directing the flame-inhibiting fluid into the flow path of air passing from the plenum chamber through the burner assembly hood and into said fire chamber.

References Cited in the file of this patent

UNITED STATES PATENTS

| | | |
|---|---|---|
| 590,884 | Garrigus et al. | Sept. 28, 1897 |
| 1,674,458 | Troger | June 19, 1928 |
| 1,762,940 | Wood | June 10, 1930 |
| 2,106,414 | Price | Jan. 25, 1938 |
| 2,160,644 | Clarkson | May 30, 1939 |
| 2,410,900 | Radbill | Nov. 12, 1946 |
| 2,520,820 | Williams | Aug. 29, 1950 |
| 2,538,492 | Anderson et al. | Jan. 16, 1951 |
| 2,539,452 | Mapes | Jan. 30, 1951 |

OTHER REFERENCES

Industrial Furnaces, vol. II, 3rd ed., 1955, p. 350, John Wiley and Sons, Inc., New York.